United States Patent
Nakagawa et al.

(10) Patent No.: US 11,998,986 B2
(45) Date of Patent: Jun. 4, 2024

(54) ALUMINA SINTERED BODY AND METHOD FOR MANUFACTURING THE SAME

(71) Applicant: CoorsTek KK, Tokyo (JP)

(72) Inventors: Takuya Nakagawa, Kariya (JP); Yuji Fukasawa, Kariya (JP)

(73) Assignee: COORSTEK GK, Tokyo (JP)

(*) Notice: Subject to any disclaimer, the term of this patent is extended or adjusted under 35 U.S.C. 154(b) by 0 days.

(21) Appl. No.: 18/145,994

(22) Filed: Dec. 23, 2022

(65) Prior Publication Data
US 2023/0201922 A1    Jun. 29, 2023

(30) Foreign Application Priority Data

Dec. 28, 2021 (JP) ................... 2021-214325
Sep. 30, 2022 (JP) ................... 2022-157534

(51) Int. Cl.
*B22F 3/16* (2006.01)
*B22F 1/10* (2022.01)

(52) U.S. Cl.
CPC .......... *B22F 3/16* (2013.01); *B22F 1/10* (2022.01); *B22F 2201/00* (2013.01); *B22F 2207/01* (2013.01); *B22F 2301/052* (2013.01)

(58) Field of Classification Search
None
See application file for complete search history.

(56) References Cited

U.S. PATENT DOCUMENTS

| | | | | |
|---|---|---|---|---|
| 6,162,413 | A * | 12/2000 | Fujiwara | C01F 7/442 |
| | | | | 423/625 |
| 2001/0054443 | A1 * | 12/2001 | Niwa | F16C 33/32 |
| | | | | 137/533.11 |
| 2011/0059839 | A1 | 3/2011 | Miyazawa et al. | |

FOREIGN PATENT DOCUMENTS

| | | | | |
|---|---|---|---|---|
| CN | 102020455 A1 | 4/2011 | | |
| JP | H05217946 A | 8/1993 | | |
| JP | H08143358 A | 6/1996 | | |
| JP | 6352686 B2 | 6/2018 | | |
| JP | 2019069889 A * | 5/2019 | ........... | C04B 35/117 |

OTHER PUBLICATIONS

Taiwanese Office Action dated Oct. 23, 2023 in correrspnding Taiwanese Patent Application No. 11220987190.

* cited by examiner

*Primary Examiner* — Seth Dumbris
(74) *Attorney, Agent, or Firm* — BUCHANAN INGERSOLL & ROONEY PC

(57) ABSTRACT

An alumina sintered body having a low dielectric loss tangent and a method for manufacturing the alumina sintered body are provided. An alumina sintered body contains $Al_2O_3$ 99.50 mass % or more, and 99.95 mass % or less and sodium and silicon, wherein at a surface layer A in any given cross-section and a central portion B of the cross-section in a depth direction from the surface layer A, a concentration ratio of sodium to silicon in the surface layer A is smaller than the concentration ratio of sodium to silicon at the central portion B.

4 Claims, 3 Drawing Sheets

ALUMINA SINTERED BODY AND METHOD FOR MANUFACTURING THE SAME

TECHNICAL FIELD

This invention relates to an alumina sintered body having a low dielectric loss and to a method for manufacturing the same, for example, an alumina sintered body having a dielectric loss tangent (tan δ) of less than $1\times10^{-4}$ and a manufacturing method thereof.

BACKGROUND ART

In recent years, an alumina sintered body for members of semiconductor- and liquid crystal panel-manufacturing apparatus is required to have not only high corrosion resistance but also a low dielectric loss tangent.

One of the reasons for the requirement of such a low dielectric loss tangent is the further stabilization of plasma in the semiconductor manufacturing apparatus.

That is, to stabilize plasma to be generated in the semiconductor manufacturing apparatus, members for semiconductor manufacturing having a low dielectric loss tangent (tan δ) need to be used; an alumina sintered body having a dielectric loss tangent (tan δ) of less than $1\times10^{-4}$ has been required as a member for semiconductor manufacturing recently.

For such a requirement, patent literature PTL 1 and 2 show that the existence of oxides of sodium is the cause of the increase in dielectric loss tangent.

In addition, the patent literature proposes that the reduction of the content of oxides of sodium allows for manufacturing an alumina sintered body having a low dielectric loss tangent (tan δ).

Patent literature PTL 3 recites that, in an alumina sintered body where in 100 mass % of whole the component, the sodium content in terms of sodium oxide $Na_2O$ is 200 ppm or more and 500 ppm or less, the silicon content in terms of silicon oxide $SiO_2$ is 200 ppm or more, the calcium content in terms of calcium oxide CaO is 200 ppm or more, and the aluminum content in terms of $Al_2O_3$ is 99.4 mass % or more. PTL 3 further recites an alumina sintered body in which a value of a dielectric loss tangent at 8.5 GHz is 0.5 times or less of a value of the Na content in terms of $Na_2O$, a value of dielectric loss tangent at 1 MHz is 0.3 times or less of a value of the sodium content in terms of $Na_2O$, and a value of dielectric loss tangent at 12 MHz is 0.6 times or less of a value of the sodium content in terms of $Na_2O$.

In other words, an alumina sintered body is shown, whose value of the dielectric loss tangent is specified based on the sodium content.

CITATION LIST

Patent Literature

PTL 1: JP-A-H08-143358
PTL 2: JP-A-H05-217946
PTL 3: JP No. 6352686

SUMMARY OF INVENTION

Technical Problem

As described above, attempts to reduce the content of oxide of sodium because the existence of the oxide of sodium is a cause of the increase in dielectric loss tangent; the oxide of sodium, as an impurity, is contained in alumina raw material which is a principal component.

Because of this, it is necessary to manufacture an alumina sintered body with highly-pure alumina raw material having reduced content of oxide of sodium.

The manufacturing cost, however, of highly-pure alumina raw materials with reduced content of oxide of sodium increases, and this resultantly causes the manufacturing cost of an alumina sintered body having a low dielectric loss also to increase.

Even though high-purity alumina raw material is used, since sodium cannot be completely removed and a trace amount of sodium remains, an alumina sintered body having a dielectric loss tangent of less than $1\times10^{-4}$ is difficult to obtain.

This invention aims at providing an alumina sintered body having a low dielectric loss tangent (tan δ) and a method for manufacturing thereof.

Solution to Problem

The alumina sintered body according to the present invention for achieving the above objective contains $Al_2O_3$ at 99.50 mass % or more and 99.95 mass % or less and further contains sodium and silicon. The alumina sintered body is characterized in that at the surface layer part A in any given cross-section and at the central portion B of the cross-section in the depth direction from the surface layer part A, the concentration ratio of sodium to silicon in the surface layer part A is smaller than that of the central portion B of the cross-section.

Thus, the concentration ratio of sodium to silicon in the surface layer part A (the concentration ratio of sodium to silicon is represented by the Na/Si ratio, and the concentration of sodium to silicon in the surface layer part A is represented by $A_{Na/Si}$) is made smaller than that in the central part B (the concentration ratio of sodium to silicon is represented by Na/Si and the concentration ratio of sodium to silicon in the central part B is represented by $B_{Na/Si}$) whereby in the surface layer part A the formation of β-alumina ($Na_2O\text{-}11Al_2O_3$), which is a factor causing large dielectric losses, in the surface layer part A is suppressed.

In other words, the formation of β-alumina ($Na_2O\text{-}11Al_2O_3$) in the surface layer part A is suppressed compared to that in the center B, thereby allowing obtaining an alumina sintered body with low dielectric losses as a whole.

Since the alumina sintered body of the present invention contains sodium and silicon as impurities, there is no need to use high-purity alumina raw materials having a reduced content of oxides of sodium, whereby the alumina sintered body can be manufactured at a low cost.

Here, the surface layer part A is a region within a range of 10 mm in the depth direction from the surface, and the central portion B of the cross-section is a region within a range of 10 mm in the depth direction centering on the center of the cross-section. Further, the dielectric loss tangent (the value of tan δ) at a frequency of 4 GHz is desirably $1\times10^{-4}$ or less.

The aspect ratio of $Al_2O_3$ crystal grains at the surface layer part A is desirably smaller than the aspect ratio of $Al_2O_3$ crystal grains in the central portion B.

β-alumina ($Na_2O\text{-}11Al_2O_3$) is formed of $Al_2O_3$ and sodium impurity, and the β-alumina ($Na_2O\text{-}11Al_2O_3$) forms crystals with a large aspect ratio. As described above, since the aspect ratio of the $Al_2O_3$ crystal grains in the surface layer part A is small, the generation of β-alumina having a large aspect ratio is suppressed, and the aspect ratio of β-alumina in the surface layer part A becomes smaller than the aspect ratio of β-alumina in the central portion B.

A method for manufacturing alumina sintered bodies according to the present invention is a method for manufacturing the above-described alumina sintered bodies; the method includes
a step of granulating granules from a mixture of alumina powder as raw material, silicon oxide as a silicon content added, and mixed with a binder and solvent, using a spray granulator,
a step of forming compacts by molding the obtained granules,
a step of degreasing the compacts, and
a step of sintering the degreased compacts at a temperature between 1300° C. and 1800° C. in a reducing atmosphere or vacuum, wherein the concentration ratio of sodium to silicon at the surface layer part A in any given cross-section is made smaller than the concentration ratio of sodium to silicon of the central portion B of the cross-section in a depth direction from the surface layer part A, by allowing the sodium content to volatile from the degreased compacts.

With this manufacturing method, alumina sintered bodies having a small dielectric loss can be obtained.

Here, it is desirable that the surface layer part A is a region within a range of 10 mm in the depth direction from the surface and the central portion B of the cross-section is a region within a range of 10 mm in the depth direction centering on the center of the cross-section.

Advantageous Effects of Invention

The present invention allows for obtaining alumina sintered bodies having a small dielectric loss and a method for manufacturing the same.

DESCRIPTION OF EMBODIMENTS

Figure 1:
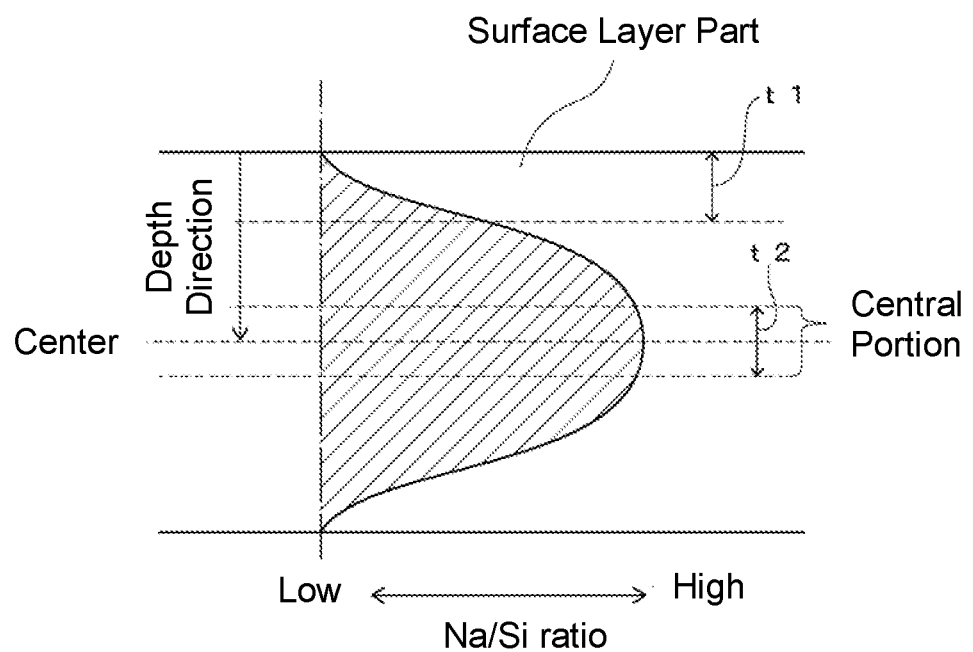
FIG. 1 is a conceptual figure showing the distribution of Na/Si ratio of an alumina sintered body according to the present invention.

The following is a detailed description of the sintered alumina body and the embodiments of its manufacturing method. The invention is not limited by the embodiment.

The alumina sintered body according to the present invention contains 99.50 mass % or more and 99.95 mass % or less of $Al_2O_3$ and contains sodium and silicon.

The sodium contained in the alumina sintered body comes from oxides of sodium contained as an impurity in the alumina raw material. Similarly, the silicon in the alumina sintered body comes from oxides of silicon as an impurity contained in the alumina raw materials or silicon oxides added.

As described above, high-purity sintered alumina, which contains as little Na and Si as possible as impurities, is preferred to be capable of reducing the dielectric loss tangent (tan δ).

However, the use of highly-pure alumina raw material with reduced content of oxides of sodium is necessary to manufacture a highly-pure alumina sintered body, which is not preferable because the manufacturing cost rises. In other words, the aluminum oxide $Al_2O_3$ content exceeding 99.95 mass % undesirably raises the manufacturing cost.

Therefore, the alumina sintered body containing aluminum oxide $Al_2O_3$ at least 99.50 mass % and sodium and silicon as impurities is used.

Because sodium affects the formation of β-alumina, reduction of sodium content is necessary to suppress the formation of β-alumina.

However, as described above, the sodium content cannot be completely null even if highly-pure alumina raw material is used.

While, when silicon is contained, sodium is attracted to silicon and suppresses the formation of a β-alumina structure. Describing in detail, since silicon is tetravalent and aluminum is trivalent, the charge balancing is collapsed when silicon exists in $Al_2O_3$, and monovalent sodium is attracted to silicon by the Coulomb force, then the formation of β-alumina is suppressed.

In other words, if the silicon content is insufficient, sodium forms a network with aluminum (sodium bonds with aluminum) because monovalent sodium is hard to be attracted to silicon by the Coulomb force, and β-alumina is more likely to be formed.

Therefore, it is necessary that the alumina sintered body according to the present invention contains 99.50 mass % or more and 99.95 mass % or less of aluminum oxide $Al_2O_3$, and sodium and silicon whose content is in a particular relationship.

Next, the relationship between the sodium and silicon content will be described below.

The sodium content in an alumina sintered body, an increasing factor of the dielectric loss tangent, is 5 ppm or more and 50 ppm or less. Typical alumina raw material contains sodium at 50 ppm or more and 500 ppm or less.

Thus, an alumina sintered body containing sodium of 5 ppm or more and 50 ppm or less can be manufactured using typical alumina raw material without extremely reducing the content of oxide of sodium, an impurity, (without costly purification), whereby the alumina sintered body can be manufactured at a low cost.

As described above, contained sodium is attracted to silicon and suppresses the formation of a β-alumina structure. The silicon content in an alumina sintered body has a specific relationship with the sodium content therein. Here the relationship between sodium and silicon content is represented by a concentration ratio of sodium to silicon (Na/Si ratio). For an alumina sintered body having a small dielectric loss, which has a dielectric loss of less than $1 \times 10^{-4}$, the concentration ratio of sodium to silicon (Na/Si ratio) is 0.3 or less.

The alumina sintered body according to the present invention is characterized that each concentration ratio of sodium to silicon (Na/Si ratio) is different at the surface layer part A in any given cross-section and the central portion B in the cross-section in the depth direction from the surface layer A.

Specifically, because the Na/Si ratio decreases in the sintering process of an alumina sintered body due to the volatilization of sodium at the surface layer part A, the concentration ratio of sodium to silicon (Na/Si ratio $A_{Na/Si}$) at the surface layer part A in any given cross-section is smaller compared to the concentration ratio of sodium to silicon (Na/Si $B_{Na/Si}$) at the central portion B of the cross-section.

That is, as shown in FIG. 1, the concentration ratio of sodium to silicon (Na/Si ratio) of the alumina sintered body is the highest at the central portion B of the cross-section and is the lowest at the surface layer parts A.

That the concentration ratio of sodium to silicon (Na/Si ratio $A_{Na/Si}$) at the surface layer part A is small compared to the concentration ratio of sodium to silicon (Na/Si $B_{Na/Si}$) at the central portion B shows that sodium volatiles efficiently.

On the contrary, when the concentration ratio at the surface layer is large, it is thought that sodium present even in small amounts forms a network with Al; there might be a risk of deteriorating the dielectric loss by forming a β-alumina structure.

It is necessary that the concentration ratio of sodium to silicon of the alumina sintered body with the dielectric loss of less than $1 \times 10^{-4}$ is 0.3 or less as described above, for example, and the concentration ratio of sodium to silicon (Na/Si ratio $A_{Na/Si}$) at the surface layer part A is small compared to the concentration ratio of sodium to silicon (Na/Si ratio $B_{Na/Si}$) at the central portion B.

Here, the surface layer part A means a region within a range of t1 in the depth direction from the surface, and the central portion B of the cross-section means a region within a range of t2 in the depth direction centering on the center of the cross-section. Specifically, t1 is 10 mm and t2 is 10 mm.

FIG. 1 is a conceptual view and does not show the exact Na/Si ratio of the alumina sintered body.

Whether the efficient reduction of sodium by volatilization of sodium is achieved in the sintering process of the alumina sintered body can be determined by comparing the Na/Si ratios at the surface layer part A and the central portion B, or by evaluating the aspect ratios, which will be described below, at the surface layer part A and the central portion B.

Figure 2:
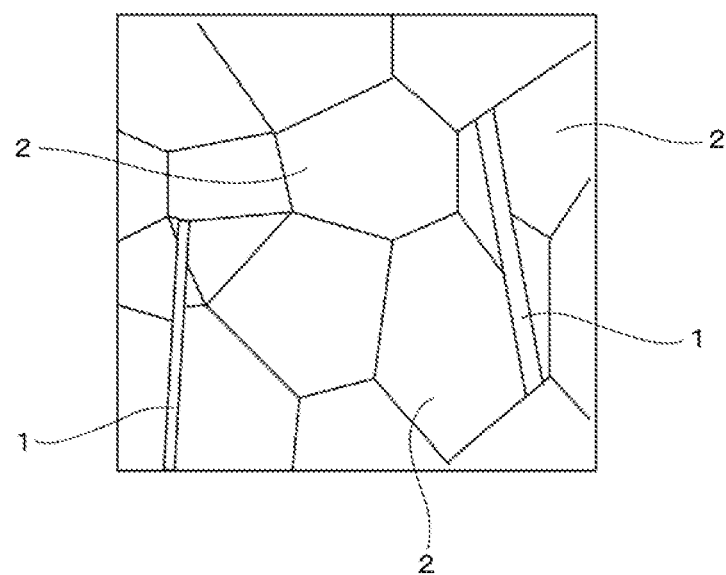
FIG. 2 is a schematic view for illustrating the aspect ratio.

Next, the aspect ratios at the surface layer part and the central portion will be described.

β-alumina ($Na_2O$-$11Al_2O_3$) 1 forms crystals having a large aspect ratio, as shown in FIG. 2. In FIG. 2, a reference sign 2 denotes the $Al_2O_3$ crystal grains.

The aspect ratio of $Al_2O_3$ crystal grains at the surface layer of the sintered body in which the formation of β-alumina ($Na_2O$-$11Al_2O_3$) is suppressed is smaller than the aspect ratio of $Al_2O_3$ crystal grains at the central portion.

The crystal growth of crystal grains having a large aspect ratio such as β-alumina ($Na_2O$-$11Al_2O_3$) is anisotropic during sintering and proceeds with causing defects. Therefore, it is speculated that, in the case of anisotropic growth, defects tend to occur along specific crystal axes and these specific defects deteriorate the dielectric loss.

Further, the aspect ratios of $Al_2O_3$ crystal grains at the surface layer part and the central portion are different, and it is speculated that the small aspect ratio at the surface part reflects that the structure occurring is a result of the efficient volatilization of sodium. In contrast, it is speculated that when the aspect ratio of $Al_2O_3$ crystal grains at the surface layer part is large or equivalent, it is in a state where the β-alumina structure tends to occur at the surface layer part, and sodium does not volatile.

Therefore, the degree of formation of the β-alumina structure and the dielectric loss tangent can be evaluated by evaluating the aspect ratios of $Al_2O_3$ crystal grains at the surface layer part and the central portion.

As it is seen, the alumina sintered body of the present embodiment is the one having a low dielectric loss tangent, even though it contains a predetermined amount of sodium as an impurity.

In addition, because the content of Al converted to $Al_2O_3$ out of 100 mass percent of the total constituents is 99.5 mass % or more, this alumina sintered body has high corrosion resistance to highly reactive halogenated corrosive gases and their plasmas.

As for the content of sodium and the content of Al converted to $Al_2O_3$ out of 100 mass % of the total, the content of sodium and aluminum can be measured with inductively coupled plasma emission spectrometer, ICPS-8100 manufactured by SHIMADZU CORPORATION, for example, after processing of crushing a part of the alumina sintered body, and dissolving the crushed powder obtained in a solution such as hydrochloric acid.

The alumina sintered body of the present embodiment contains silicon as constituent other than aluminum and sodium, as described above. The silicon content is preferably 20 ppm or more out of 100 mass % of the total constituent.

The above sodium and silicon exist in the grain boundary phase between alumina crystals as the crystal phase consisting of an oxide or the amorphous phase.

The concentration ratios at the surface layer part A and the central portion B (Na/Si ratio; $A_{Na/Si}$ and $B_{Na/Si}$) can be calculated as follows.

First, a part of the alumina sintered body is etched to obtain a measuring surface by a processing apparatus such as ion-thinning apparatus, then a specific area of the measuring surface is observed by transmission electron microscope TEM at an acceleration voltage of 200 kV with a magnification of 10,000 to 100,000. Then, measurement of the grain boundary phase is performed by energy dispersive X-ray spectrometry EDS to obtain the content of each constituent. A ratio, A/B, is obtained, where A is the content of sodium and B is the content of silicon. It is preferable to perform EDS measurements at multiple locations in a single grain boundary phase, e.g., three locations, and calculate the ratio A/B using the average value, then rounded off to the third decimal place.

If the grain boundary phase does not contain aluminum, after a portion of the alumina sintered body is crushed, and the resulting powder is dissolved in a solution such as hydrochloric acid, the sodium and silicon contents are measured using an ICP emission spectrometer, and the ratio (A/B) is calculated using each value.

The dielectric loss tangent of the alumina sintered body of the present embodiment can be measured using a capacitance meter (HP-4278A), an impedance analyzer (HP-4291A), and a cavity resonator (Network Analyzer 8722ES) at a frequency of 4 GHz, respectively, using samples fabricated to a disk of 50 mm diameter and 1 mm thickness.

A method for manufacturing an alumina sintered body according to the present invention will be described.

Figure 3:
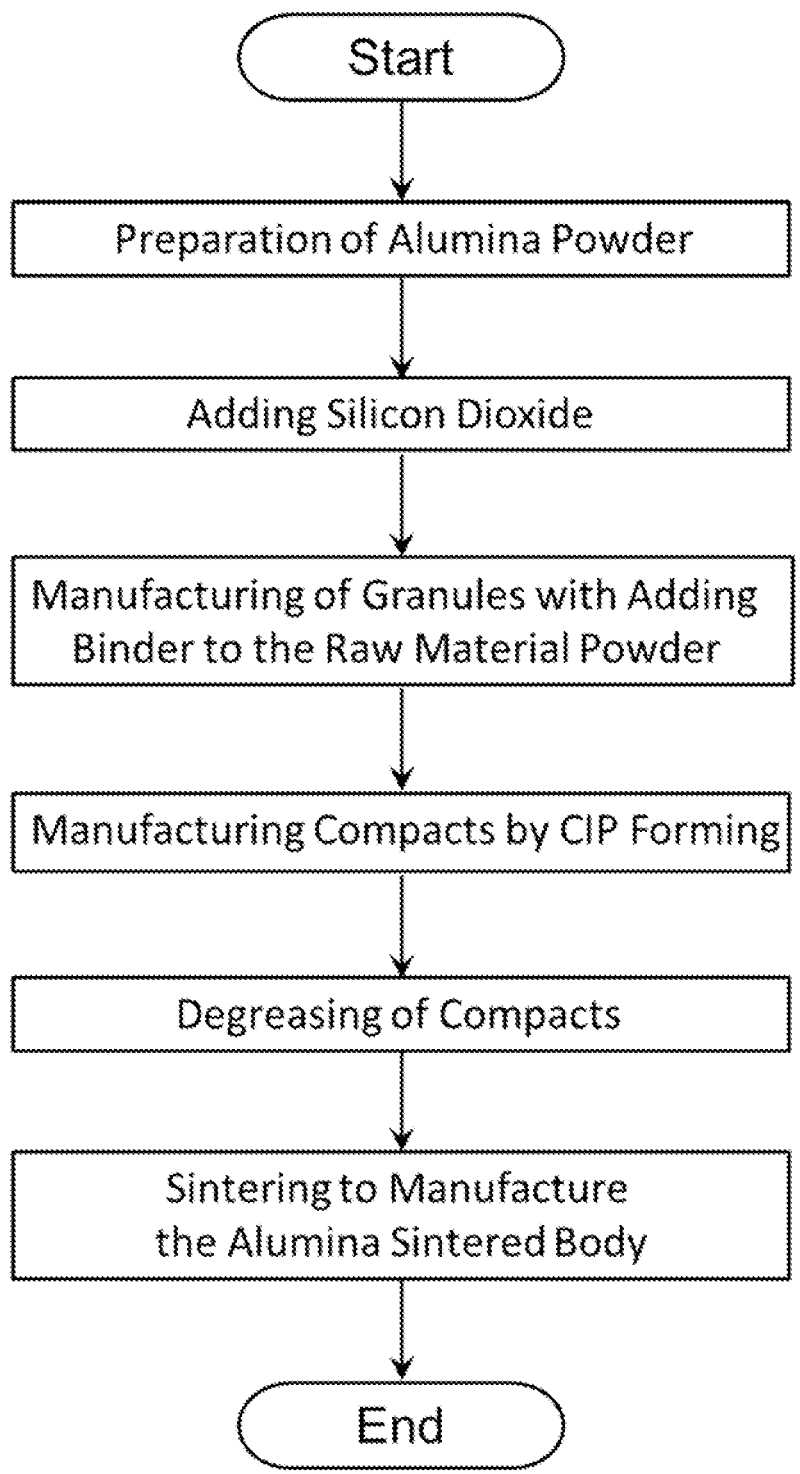
FIG. 3 is a flowchart illustrating an example of a manufacturing method of the alumina sintered body.

First, as raw material, alumina powder with the $Al_2O_3$ purity of 99.5 mass % or more and 99.95 mass % or less and an average diameter of 1 to 2 μm is prepared (Step S1 in FIG. 3).

Though high-purity alumina powder is preferable, it may contain sodium as an impurity of 200 ppm or less.

It is noted that in this embodiment, the sodium content is only specified as an impurity, and sodium is not actively added to the alumina powder.

Silicon component is added to alumina powder as raw material using silicon dioxide powder. In addition to silicon dioxide powder, colloidal silica and tetraethoxysilane can be used. Silicon additive content is 40 to 300 ppm.

Thus the raw material powder is prepared by adding silicon dioxide $SiO_2$ (Step S2 in FIG. 3).

Then, a binder such as polyvinyl alcohol and solvent are mixed (Step S3 in FIG. 3); mixing is performed using a mixer at a revolution speed of 200 rpm at room temperature. Granules are formed by granulating the mixture.

Next, the granules are filled into a forming mold, and compacts are fabricated using cold isostatic press CIP at a pressure ranging from 80 to 200 MPa (step S4 in FIG. 3).

The compact is then subjected to a degreasing process to form a degreased body. This degreasing treatment is performed by baking at 700° C. to 1300° C. in an atmospheric atmosphere (Step S5 in FIG. 3).

Further, the degreased compact is sintered at 1300° to 1800° C. in a reducing atmosphere or in a vacuum to obtain an alumina sintered body (Step S6 in FIG. 3). The reducing atmosphere is preferably a hydrogen atmosphere or a halogen gas atmosphere. Sodium volatilizes when sintered at 1300° to 1800° C. in a reducing atmosphere or vacuum.

As a result, an alumina sintered body is obtained in which the Na/Si ratio at the surface layer part A in any given cross-section of the alumina sintered body is small compared to the concentration ratio of sodium to silicon Na/Si at the central portion B of the cross-section in the cross-section in the depth direction from the surface layer part A.

Thus, the reduction of the Na/Si ratio by volatilization of sodium causes suppression of the formation of β-alumina ($Na_2O$-$11Al_2O_3$) which is a factor of a large dielectric loss, and alumina sintered bodies with a dielectric loss of less than $1\times10^{-4}$ are obtained. β-alumina ($Na_2O$-$11Al_2O_3$) causes to grow a crystal with a large aspect ratio. Correspondingly, the aspect ratio of $Al_2O_3$ crystal grains in the surface layer part of the sintered body in which the formation of β-alumina ($Na_2O$-$11Al_2O_3$) is suppressed is smaller than the aspect ratio of $Al_2O_3$ crystal grains at the central portion. The aspect ratio is obtained by selecting the grain having the largest aspect ratio in the observed images when the texture of the alumina sintered body is observed by scanning electron microscopy.

As described above, alumina sintered bodies having a low dielectric loss can be manufactured, even when alumina raw material containing oxides of sodium as impurities is used; in particular, those having a dielectric loss tangent (tan δ) of less than $1\times10^{-4}$ can be obtained.

Alumina sintered bodies have excellent heat resistance, chemical resistance, and plasma resistance, and they also have a low dielectric loss tangent (tan δ) in the high-frequency range. Because of this, they are used for semiconductor manufacturing equipment components, including inner wall materials (chambers), microwave introduction windows, shower heads, focus rings, and shield rings in semiconductor manufacturing equipment, and LCD panel manufacturing equipment components, including stages, mirrors, mask holders, mask stages, chucks, and reticles in LCD panel manufacturing equipment.

EXAMPLES

An alumina sintered body and a method for manufacturing the same according to the present invention will be further described based on examples.

Experiment 1

In Example 1, alumina powder having a purity of 99.5 mass % and average grain size of 1 to 2 μm is used as raw material.

The amount shown in Table 1 of silicon dioxide $SiO_2$ was added to the alumina powder. The sodium content in the raw material powder was 60 ppm.

Further, granules were formed by granulating a mixture that is prepared by adding 2 mass % of polyvinyl alcohol as a binder to the 100 mass % of the raw material powder containing the additive.

Next, the granules are filled into a forming mold, compacts were fabricated using a cold isostatic press CIP at a pressure of 100 MPa.

Thereafter, the compacts were subjected to degreasing processing and sintered at 1800° C. in a hydrogen atmosphere to obtain an alumina sintered body (alumina ceramics).

Then, a part of the alumina sintered body was etched to obtain a measuring surface by a processing apparatus such as ion-thinning apparatus, and then a specific field of vision of the measuring surface was observed by transmission electron microscope TEM at an acceleration voltage of 200 kV with a magnification of 50,000. Then, measurement of the grain boundary phase was performed by energy dispersive X-ray spectrometry EDS to obtain the content of each constituent. Then, a ratio, X/Y, was calculated, where X is the content of sodium and Y is the silicon content.

The measurement area etched by a processing apparatus is defined as the surface layer part A on the arbitrarily predetermined cross-section and the central portion B on the cross-section in a depth direction from the surface layer part A. The ratio X/Y at the surface layer part A is denoted as $A_{Na/Si}$ and the ratio X/Y at the central portion B as $B_{Na/Si}$.

Further, the dielectric loss tangent (tan δ) at the surface layer part A and the central portion B were measured at a high-frequency region (4 GHz) by a method conforming to JIS R1641 (Measurement method for dielectric of fine ceramic plates at microwave frequency). The results are shown in Table 1.

TABLE 1

| | $A_{Na/Si}$ | $B_{Na/Si}$ | Analyzed Si amount (ppm) Surface layer/ Central portion | tan δ (E−05) Surface layer/ Central portion | Added $SiO_2$ amount (ppm) |
|---|---|---|---|---|---|
| Example 1 | 0.107 | 0.186 | 67/70 | 7.09/7047 | 160 |
| Example 2 | 0.119 | 0.214 | 68/70 | 7.06/7.90 | 160 |
| Example 3 | 0.081 | 0.185 | 120/130 | 6.72/8.47 | 285 |
| Example 4 | 0.072 | 0.117 | 100/130 | 6.53/7.99 | 285 |
| Comparative Example 1 | 0.12 | 0.12 | 76/220 | 9.06/10.43 | 480 |
| Comparative Example 2 | 0.08 | 0.06 | 121/250 | 7.73/11.4 | 540 |

As seen from Examples 1 to 4 in above Table 1, sodium content decreases on the surface layer part and the Na/Si ratio thereon is smaller than the Na/Si ratio at the central portion. In addition, it is confirmed that the dielectric loss becomes smaller as the Na/Si ratio becomes smaller.

In Comparative Examples 1 and 2 in Table 1, because an attempt to raise the silicon concentration at the central portion caused the added silicon amount to exceed 200 ppm which is considered to be an appropriate amount, an increasing tendency of the dielectric loss tangent due to the excessive amount of silicon was seen.

That is, throughout the sintered body, the Na/Si ratio reduces due to the effects of segregation and nonuniformity of silicon occurring in the manufacturing process, and the concentration of silicon is higher in the central portion than that in the surface layer part.

As described above, a low Na/Si ratio can be obtained by volatilizing sodium during the sintering process. In addition, the reduction of the Na/Si ratio enabled the value of the dielectric loss to be less than $1\times10^{-4}$.

In addition, by adding silicon in a range of 130 ppm or more to 200 ppm or less can while maintaining the Na/Si value small, the dielectric loss can be further reduced. The Na/Si ratio can be adjusted by the added amount of sodium and silicon.

Experiment 2

In Experiment 2, the aspect ratios of $Al_2O_3$ crystal grains of Example 1 of Experiment 1 and Comparative Example 3 were measured by scanning electron microscopy. In addition, similar to Experiment 1, the dielectric loss tangent (tan δ) in the high-frequency range (4 GHz) at the surface layer part A and the central portion B were measured by a method in conforming to JIS R1641 (Measurement method for dielectric of fine ceramic plates at microwave frequency). Table 2 shows the results.

In Comparative Example 3, the aspect ratio of $Al_2O_3$ crystal grains was changed by adjusting the sintering time and the speed of the lowering temperature after the sintering of Example 1.

Specifically, in comparison to Example 1, the sintering temperature was 1400° C. and the speed of the lowering temperature was 300° C./h. Other conditions were the same as that in Example 1. Table 2 shows the results.

TABLE 2

|  | Ratio of Aspect ratio (A/B) | tan δ (E−05) Surface layer/ Central portion |
|---|---|---|
| Example 1 | 0.9 | 7.09/7.47 |
| Comparative Example 3 | 1.12 | 8.33/12.6 |

As a result, it is confirmed that in Comparative Example 3, the aspect ratio of $Al_2O_3$ crystal grains is larger compared to Example 1, and the dielectric loss tangent increases. Therefore, by adjusting the sintering time and the temperature lowering speed after the sintering, the tan δ (E-05) surface/center can be reduced and the dielectric loss tangent can be decreased.

Experiment 3

An aluminum sintered body was manufactured by further fine-adjusting the sintering temperature and the sintering time based on the manufacturing condition of Example 4 such that the analytical value of silicon falls in a range of 130 ppm to 200 ppm both in the surface layer part and the central portion. This manufacturing is defined as Example 5. The added content of $SiO_2$ was 185 ppm.

As a result, in Example 5, $A_{Na/Si}$ is 0.062, $B_{Na/Si}$ is 0.095, the silicon analytical value (ppm, Surface/Center) is 90/110, and tan δ (E-05) (Surface/Center) is 5.58/9.67. In an alumina sintered body made to have the analytical silicon values in a range of 130 ppm to 200 ppm both in the surface layer part and the central portion, the dielectric loss tangent can be further reduced than that in Example 4.

What is claimed is:

1. An alumina sintered body containing $Al_2O_3$ in an amount of 99.50 mass % or more, and 99.95 mass % or less, the alumina sintered body further containing sodium and silicon,
   wherein a dielectric loss tangent (a value of tan δ) at 4 GHz is $1\times10^{-4}$ or less,
   wherein at a surface layer A in any given cross-section and at a central portion B of the cross-section in a depth direction from the surface layer A, a concentration ratio of sodium to silicon in the surface layer part A is smaller than the concentration ratio of sodium to silicon at the central portion B,
   wherein the concentration ratio of sodium to silicon of the alumina sintered body is 0.3 or less, and
   wherein the surface layer part A is within a range of 10 mm from a surface in the depth direction, and the central portion B is a region within a range of 10 mm in the depth direction centering at a center of the cross-section.

2. The alumina sintered body recited in claim 1, wherein an aspect ratio of an $Al_2O_3$ crystal grain in the surface layer part A is smaller than the aspect ratio of the $Al_2O_3$ crystal grain at the central portion B.

3. A method for manufacturing the alumina sintered body recited in claim 1, comprising:
   a step of granulating granules from a mixture of alumina powder as raw material to which silicon dioxide powder used as a silicon content is added, and mixed with a binder and solvent, using a spray granulator,
   a step of forming compacts by molding the obtained granules,
   a step of degreasing the compacts, and
   a step of sintering the degreased compacts at a temperature between 1300° C. and 1800° C. in a reducing atmosphere or vacuum,
   wherein the concentration ratio of sodium to silicon at the surface layer part A in any given cross-section is smaller than the concentration ratio of sodium to silicon at the central portion B of the cross-section in the depth direction from the surface layer part A, by allowing the sodium content to volatile from the degreased compacts.

4. The alumina sintered body recited in claim 1, wherein the concentration ratio of sodium to silicon in the surface layer part A is 0.072 to 0.119 and the concentration ratio of sodium to silicon at the central portion B is 0.117 to 0.214.

* * * * *